(No Model.)
A. A. FISHER.
GEARING.
No. 542,882. Patented July 16, 1895.
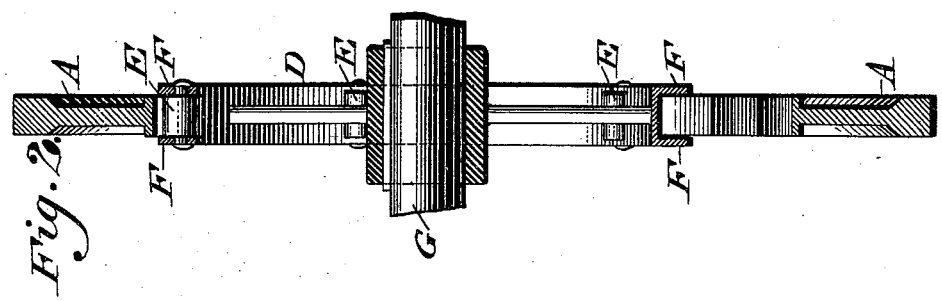
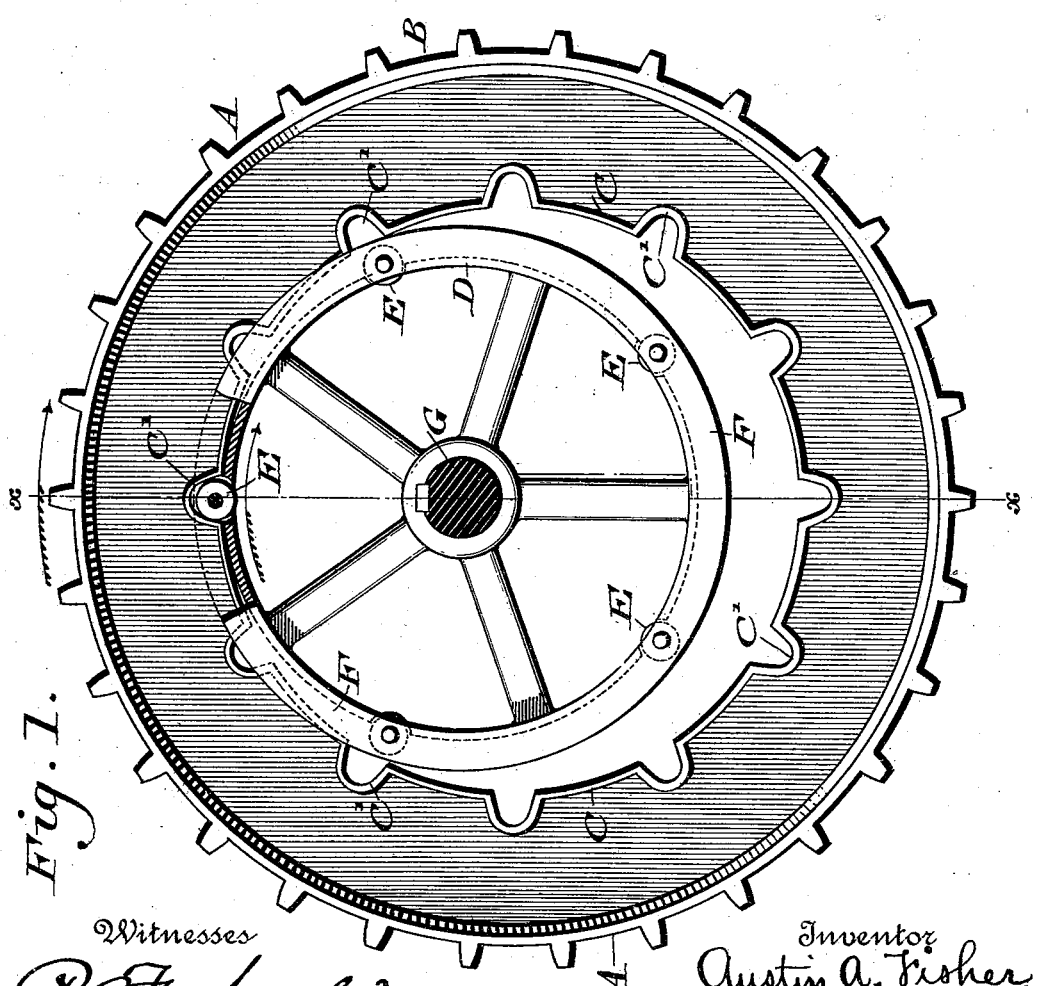
Witnesses
P. F. Nagle.
L. Douville.
Inventor
Austin A. Fisher.
By Joshua Biedersheim
Attorney

UNITED STATES PATENT OFFICE.

AUSTIN A. FISHER, OF ALLENTOWN, PENNSYLVANIA.

GEARING.

SPECIFICATION forming part of Letters Patent No. 542,882, dated July 16, 1895.

Application filed January 19, 1895. Serial No. 535,471. (No model.)

*To all whom it may concern:*

Be it known that I, AUSTIN A. FISHER, a citizen of the United States, residing at Allentown, in the county of Lehigh, State of Pennsylvania, have invented a new and useful Improvement in Gearing, which improvement is fully set forth in the following specification and accompanying drawings.

My invention consists of a novel system of gearing which is capable of general adaptation, but which is especially applicable to bicycles and similar motors, provision being made for transmitting the power applied to the shaft of a small wheel which has rollers mounted thereon to a larger wheel which is supported upon said small wheel, said rollers engaging recesses in the inner circle of said large wheel, the outer periphery of the latter being provided with spurs, which are adapted to be engaged by a suitable sprocket-chain, whereby the power may be transmitted to the rear wheel of a bicycle, the power initially applied to the shaft of the small wheel being thus greatly augmented, all as will be hereinafter set forth.

Figure 1 represents a partial side elevation and partial section of gearing embodying my invention. Fig. 2 represents a diametrical section thereof on line $x$ $x$, Fig. 1.

Similar letters of reference indicate corresponding parts in the two figures.

Referring to the drawings, A designates a wheel which is of the form of an annulus, having an exterior toothed periphery B and an interior recessed circle C, the walls of the recesses C' of said circle C serving as teeth.

D designates a wheel of much smaller diameter than that of the inner circle C of the outer wheel A, the same having mounted on its periphery the rollers E, which are adapted to enter the recesses of the circle C, as more particularly shown in Fig. 1, it being noticed that said wheel D is eccentrically within said wheel A.

On the sides of the periphery of the wheel D are radiating rims F, which freely embrace the sides of the inner circle of the outer wheel for preventing lateral displacement of one wheel from the other.

The smaller or inner wheel is mounted upon the shaft G so as to revolve in unison therewith, it being understood that said shaft G is mounted in suitable bearings, as in the frame of a bicycle when the device is applied thereto, and that the power is applied initially to the said shaft G.

The outer wheel A is mounted upon said inner wheel D so that its recessed portions will successively engage the rollers E of said inner wheel, it being evident that whatever force is applied initially to the shaft G, and thence to the small wheel D, will be transmitted to the large wheel A, from which point power may be transmitted by the use of a suitable sprocket-chain or similar device to any desired point, it being apparent that the power initially applied to said shaft G is greatly augmented, especial attention being called to the fact that the wheel D forms the only support for the outer wheel A, which latter runs easily and lightly thereon, the friction being reduced to a minimum by means of the rollers E, there being but little noise, it being noted that the wheel D as the driving-wheel runs on a solid center—viz., the shaft G—which has its bearings in any suitable fixed point, as the frame of a bicycle, to which latter my invention is especially applicable, the same being also adapted for running steam and other engines and vehicles of every description, wherein, by imparting a slight force to the shaft G and the wheel D, increased power is obtained by means of the wheel A, actuated and supported by said inner wheel D in the manner described.

I am aware that it is not broadly new to provide an inner and outer gear with intermeshing teeth so that the same will revolve in unison; but especial emphasis is laid upon the fact that in the present invention the prime motor is the inner wheel or the shaft or axle of said inner wheel, the motion being transmitted therefrom to said outer wheel, the only support of the latter being said inner wheel, thereby reducing the cost of production, minimizing the friction, and producing a device much more efficient and serviceable than heretofore.

Having thus described my invention, what I claim as new, and desire to secure by Letters Patent, is—

1. In a device of the character described, the shaft or axle G, the wheel D mounted thereupon, and having rollers mounted on its periphery, in combination with an outer wheel having an exterior toothed periphery B, and an inner circle C with recesses C' therein, adapted to be engaged by said rollers, said inner wheel forming the only support for said outer wheel, and said shaft G being adapted to receive the initial power alone, substantially as described.

2. The herein described gearing consisting of the shaft G, the wheel D attached thereto and rotatable in unison therewith, the rollers E mounted on said wheel, the outer wheel A having the exterior toothed periphery B, and the inner recessed circle C adapted to be engaged by said rollers and one of said wheels being provided with flanges, whereby any lateral displacement relatively to each other is prevented said inner wheel affording the only support for said outer wheel, and said shaft G being adapted to receive power initially, substantially as described.

AUSTIN A. FISHER.

Witnesses:
EDWARD RUHE,
C. E. PENNY.